United States Patent
Balasubramanian et al.

(10) Patent No.: US 10,600,017 B2
(45) Date of Patent: Mar. 24, 2020

(54) CO-OPETITION INDEX BASED ON RIVAL BEHAVIOR IN SOCIAL NETWORKS

(71) Applicant: International Business Machines Corporation, Armonk, NY (US)

(72) Inventors: Swaminathan Balasubramanian, Troy, MI (US); Radha M. De, Howrah (IN); Ashley D. Delport, Durban (ZA); Indrajit Poddar, Sewickley, PA (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 14/967,662

(22) Filed: Dec. 14, 2015

(65) Prior Publication Data

US 2017/0169378 A1 Jun. 15, 2017

(51) Int. Cl.
| | | |
|---|---|---|
| G06Q 10/06 | (2012.01) | |
| G06Q 30/02 | (2012.01) | |
| G06Q 50/00 | (2012.01) | |
| G06F 16/951 | (2019.01) | |
| H04L 29/08 | (2006.01) | |

(52) U.S. Cl.
CPC ..... *G06Q 10/06375* (2013.01); *G06F 16/951* (2019.01); *G06Q 10/06393* (2013.01); *G06Q 30/0201* (2013.01); *G06Q 50/01* (2013.01); *H04L 67/22* (2013.01); *H04L 67/306* (2013.01)

(58) Field of Classification Search
CPC ....... G06Q 10/06375; G06Q 10/06393; G06Q 50/01; G06Q 30/0201; H04L 67/306; H04L 67/22; G06F 16/951
See application file for complete search history.

(56) References Cited

U.S. PATENT DOCUMENTS

| | | | |
|---|---|---|---|
| 7,676,034 B1 | 3/2010 | Wu et al. | |
| 2003/0088448 A1* | 5/2003 | Tan | G06Q 10/06315 705/7.25 |
| 2008/0300960 A1* | 12/2008 | Williams | G06Q 10/06 705/7.32 |
| 2013/0311470 A1 | 11/2013 | Lotfi | |
| 2014/0156681 A1 | 6/2014 | Lee et al. | |

(Continued)

OTHER PUBLICATIONS

Kauffman et al., Does Co-opetition change the game? A Bayesian analysis of firm participation strategy in an industry standard-setting organization, Proceedings of the 43rd Hawaii International Conference on System Sciences—2010. (Year: 2010).*

(Continued)

*Primary Examiner* — Nadja N Chong Cruz
(74) *Attorney, Agent, or Firm* — VanLeeuwen & VanLeeuwen; Jason H. Sosa (57) ABSTRACT

An approach is provided that creates a co-opetition index. The co-opetition index is created by mining data from online sources that are related to competitor activities associated with a competitor of an organization. The competitor is selected from many competitors of the organization. Possible business actions are automatically identified that correspond to the competitor activities. The set of possible business actions are analyzed using a game theory analysis. The game theory analysis results in an identification of next actions that maximize a payoff to the organization. The co-opetition index is adjusted based on a classification of the next actions on a competitiveness scale. The resulting co-opetition index is then provided to a user of the system.

17 Claims, 7 Drawing Sheets

(56) References Cited

U.S. PATENT DOCUMENTS

2014/0162220 A1    6/2014   Rao et al.
2014/0222909 A1    8/2014   Ford et al.

OTHER PUBLICATIONS

Gnyawali et al., Co-opetition between giants: Collaboration with competitors for technological innovation, Research Policy 40 (2011) pp. 650-663. (Year: 2011).*

Murdock et al., Statistical Approaches to Question Answering in Watson, Mathematics Awareness Month theme essay, Joint Policy Board for Mathematics (JPBM), 2012. (Year: 2012).*

Liu, Rebecca, Cooperation, competition and coopetition in innovation communities, School of Business, Management and Economics, University of Sussex, Falmer, Brighton, UK. Published online: Sep. 10, 2013. (Year: 2013).*

Okura et al., Coopetition and Game Theory, Journal of Applied Economic Sciences • Jan. 2014. (Year: 2014).*

Sun et al., EvoRiver: Visual Analysis of Topic Coopetition on Social Media, IEEE Transactions on Visualization and Computer Graphics, vol. 20, No. 12, Dec. 2014. (Year: 2014).*

Karen Scates, Harness the Power of Competitor Data to Improve Findability, Jul. 27, 2015. (Year: 2015).*

Gnyawali et al., Impact of Co-Opetition on Firm Competitive Behavior: An Empirical Examination, Journal of Management, vol. 32 No. 4, Aug. 2006 507-530 (Year: 2006).*

Narayanam, "Game Theoretic Models for Social Network Analysis," IBM Research, Bangalore, India, Feb. 2012, 91 pages.

Nurmi, "Bayesian game theory in practice: A framework for online reputation systems," University of Helsinki, Finland, Department of Computer Science, Series of Publications C, Report C-2005-10, Mar. 2005, 24 pages.

\* cited by examiner

CO-OPETITION INDEX BASED ON RIVAL BEHAVIOR IN SOCIAL NETWORKS

BACKGROUND

In current times, co-opetition is a common behavior seen in commercial enterprises. Co-opetition is loosely defined as a cooperative competition. In a co-opetitive environment, enterprises take into account cooperative and competitive behavior in aggregate to make optimal strategic decisions. Typical use cases include a company making a splashy announcement e.g. bigger and better than what their rivals had tweeted and yet not affect cooperation in other unrelated areas where rivals engage in cooperative research. Other examples include brands offering more lucrative discounts than what their competitors had offered in order to win over consumers based on a blog post they made, opposing industries offering better services in a specific area due to negative feedback on social networks from residents, political opposition beating the rival to that blue shirt campaign, etc. A challenge with current co-opetition is that decisions are often made on "gut feel" or intuition with little or no numeric analysis regarding actions and their effect on co-opetition.

Presently social networks are focused on identifying people/topics you would want to be socially interactive with (e.g., friends, colleagues, etc.) but these relationships do not take into account rivals over which you may want to gain a competitive advantage. It is difficult to keep track of rivals (since there is no friend relationship), and it is also difficult to keep track of changing relationships of former friends turning into rivals. Social media analytics and data mining techniques are used for information retrieval, statistical modeling and machine learning. These techniques employ data pre-processing, data analysis, and data interpretation processes in the course of data analysis. These solutions can be expensive, and might require employment of data scientists and knowing entities, attributes, patterns and data access in order to obtain useful analysis. In addition, some businesses may only run this type of analysis at set times or obtain the information through a 3rd party which could be too late to gain the competitive advantage over a competitor if such opportunity has already passed.

BRIEF SUMMARY

An approach is provided that creates a co-opetition index. The co-opetition index is created by mining data from online sources that are related to competitor activities associated with a competitor of an organization. The competitor is selected from many competitors of the organization. Possible business actions are automatically identified that correspond to the competitor activities. The set of possible business actions are analyzed using a game theory analysis. The game theory analysis results in an identification of next actions that maximize a payoff to the organization. The co-opetition index is adjusted based on a classification of the next actions on a competitiveness scale. The resulting co-opetition index is then provided to a user of the system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

FIGS. 1-7 depict an approach that creates a co-opetition index based on rival behavior in social networks. In the approach, a co-opetition index is created based on rival behavior as found in online sources, such as social networks. The approach includes a friendship/rival co-opetition scale (algorithm) that can be set. For example, the index can be a scale value from 1 to 10 with 1 being a business partner (friend) and 10 being major competitor (foe). The other increments (2 to 9) being set to increase or decrease the relationship strength. The index can also be changed over time. A second component allows for specific entity (organizations, individuals, pages, etc.) to be added (known rivals/friends list) so the approach takes these into account as part of pattern analysis. A third component allows for listing keywords that should be included in the pattern analysis engine. The pattern analysis engine uses the information to mine online data (e.g., posts, "likes," feeds, comments, announcements, etc.) in relation to the scale in addition to social network analysis will learn over time when to notify decision makers of situations that could gain the opposition an advantage or opportunity.

The pattern analysis engine uses Bayesian Game Theory payoff functions to increase or decrease the co-opetition scale. In addition, the approach automatically adjusts the scales and keyword components. Similar to social media friend suggestions, the engine also recommends rival/competitor suggestions to add to an organization's "watch list" based on pattern analysis and rival relationships. The scale can automatically be adjusted by the engine given new information. For example, when a known business partner (friend) posts a negative comment or becomes friends with a known rival, thereby automatically increasing the co-petitive index scale (e.g., from 1 to 3, etc.) and notifies a decision maker of the change in the business partner. The notification component is responsible for sending messages as information becomes available using either email, SMS or Push notifications.

The co-petitive index approach described herein provides an organization with various competitive advantages. First, the organization is notified of a rival's social activity that can be used to gain a competitive advantage. Second, the organization is notified of new potential rivals either through pattern analysis or relationships to existing rivals (e.g. new startups, etc.). Third, the organization is notified when friends/business partners forge relationships with known rivals moving them to your "watch list" and changing their co-petitive index value. In addition, the approach provides cost savings to the organization as it avoids the need for costly social media analytic solutions, data scientists etc.

The co-opetition scale component is used to define a rivals strength using an algorithm between linked entities (e.g., 1 being a business partner (friend) to 10 being a major competitor (foe). This scale can be adjusted to increase the relationship strength using increments 2 through 9. The higher the rival strength, the more analysis and content will be analyzed through the pattern analysis engine based on Bayesian Game Theory. The known entity component is used to define known entities such as organizations, individuals, specific pages to monitor, group sites, etc. When these entities are added, the organization can set their scale size in relation to the rival scale component. The keyword component is used to define a list of keywords that the organization wants the pattern analysis engine to take into account during the analysis. The keyword component is used to find other rivals by using these keywords in the analysis.

The pattern analysis engine is responsible for performing several functions. These functions include mining the data from online sources, such as social networks, using the co-petitive index scaling algorithm, entity and keyword components and applying advanced social media analytics and data mining techniques to identify relevant content. The pattern analysis engine also identifies new rivals from the keyword analysis and adjusts existing rival relationships. The pattern analysis engine further identifies existing friendly/partner relationships that have been forged an associations with existing rivals. The pattern analysis engine passes the data on to the relevance component for adjusting the co-opetition scale.

The relevance component is responsible for performing several functions that include determining whether the information has relevance in relation to decisions made on prior content (e.g., show more of this/less of this concept, etc.) to avoid unnecessary information from being sent. The relevance component also automatically adjusts the co-opetition scale component for entities that have new associations with existing rivals (e.g., adding entities to the "watch list" using the output of a payoff function for each rival, etc.). The relevance component further stores decisions made based on content and updates the pattern analysis engine accordingly. The relevance component sends valid content to the notification component and grades, or scales, the relevance based on a threshold level to generate alerts dynamically with a measure of criticality. The relevance factor is computed based on the type of activity of the rival and how it impacts own strategies. The relevance factor can be positive or negative. A positive relevance factor indicates a rival activity that benefits us (e.g., a skilled player leaves the rival team, the rival company loses an order, etc.). A negative relevance factor, such as the rival sports team appointing a new coach or receiving additional media coverage. The notification component is used to send content through multiple channels such as email, SMS or Push notifications to decision makers in the organization.

The pattern analysis performs various steps in both the Competitor Analyzer/Identifier and the Competitive Activity Analyzer components. Steps performed by the pattern analysis include analyzing events, such as announcements or comments or profile changes, from online sources such as social network sources, from known entities as well as related entities against the keywords established by the organization. For each event, the pattern analysis automatically determine a set of probable next actions and corresponding payoffs (e.g., a counter announcement or a new partnership, etc.). The pattern analysis performs a Bayesian game theory analysis to determine which next action will maximize the payoff to the organization. In one embodiment, the payoff is maximized when in the co-opetition index of the rival sits in the middle of the scale (e.g., a 5 in a 10 point scale, etc.). Each next action is classified into a competitive action or a collaborative action. Depending on the class of the next action, the rival's co-petitive index is adjusted (e.g., either positively if it is a competitive action or negatively if it is a friendly action, etc.). The organization creates a profile of the organization with interests, activities, areas of interest, action plans, etc.

The Competitor Analyzer/Identifier module uses the organization's profile information and mines the online data, such as social media data, to identify potential Rivals/Competitors. The analysis is orthogonal to the friends recommendation system prevalent in industry. This identification is also based on "conflict of interests" such as in "rival sports teams", "competing businesses", "rival political parties", and may include such areas as "competing mass media channels," etc. A dynamic list of "competitors" is maintained in a repository and updated continuously. The organization can also provide a list of "competitors" to this list as a supplement to the list or as seed information when generating the list. Once the list of competitors is available, the "Activity Analyzer" identifies information that may be interesting to the organization. In one embodiment, this is the opposite of identifying "common interests" used by traditional recommendation systems. Unusual activities, distinct approaches (e.g. a rival political party is buying a specific TV channel air time, a competing sports team recruiting a new coach, a rival business expanding coverage of a new set of products, opening a new office or branch in a new location, announcement of a sale or rebates, participating in a special event, launching anew initiative, an acquisition rumor, new market wins/losses, etc. In one embodiment, the activity significance is computed based on potential adversary effects, unusual nature, even unexpected or unknown impact events, which need to be monitored or tracked. The activities of an adversary/rival/competitor is often compared with the organization's own activities, plans, and expectations, etc. Appropriate alerts reports can be produced by the system based on threshold(s) or objective functions set by the organization's decision makers.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
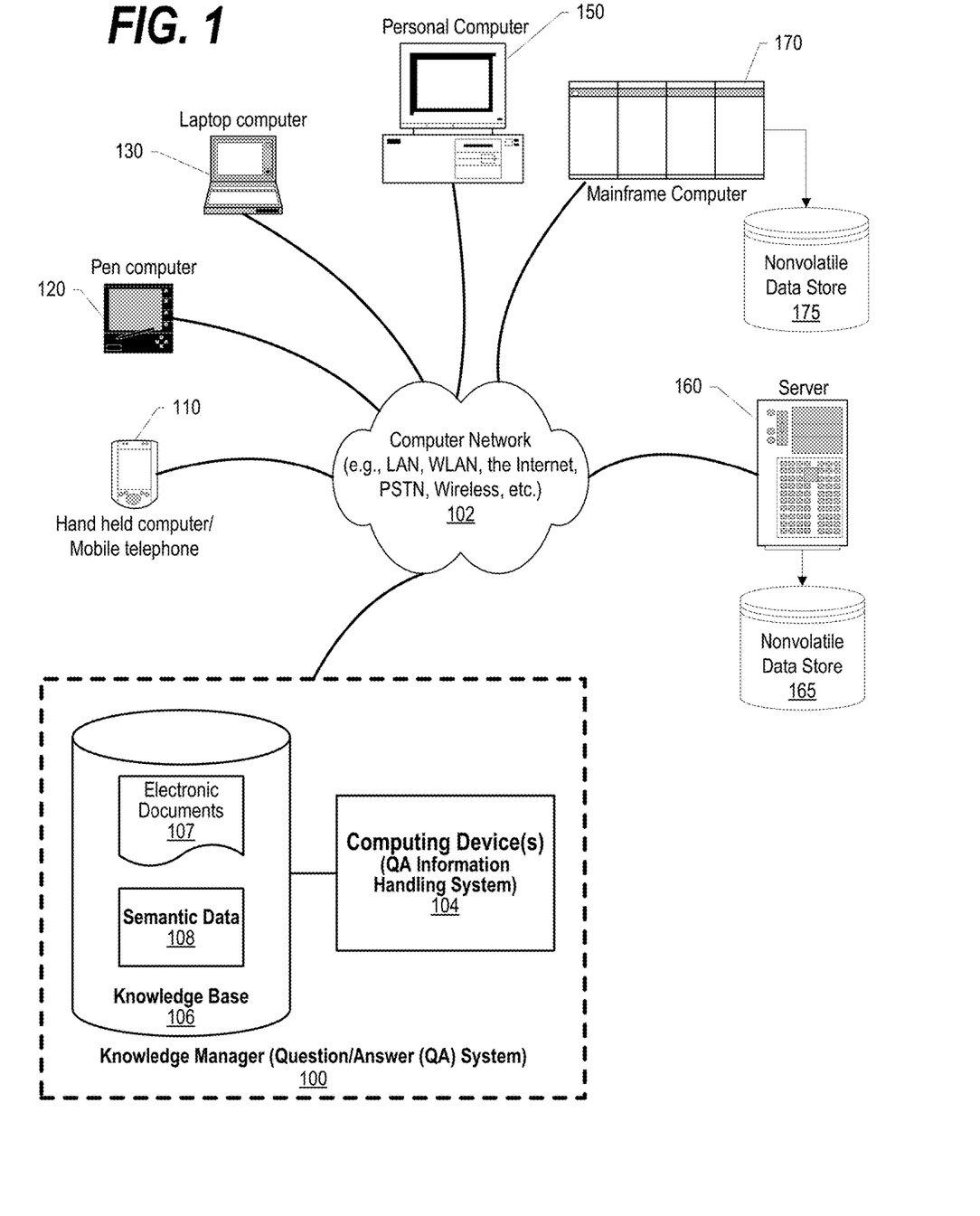
FIG. 1 depicts a schematic diagram of one illustrative embodiment of a question answering (QA) system in a computer network.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
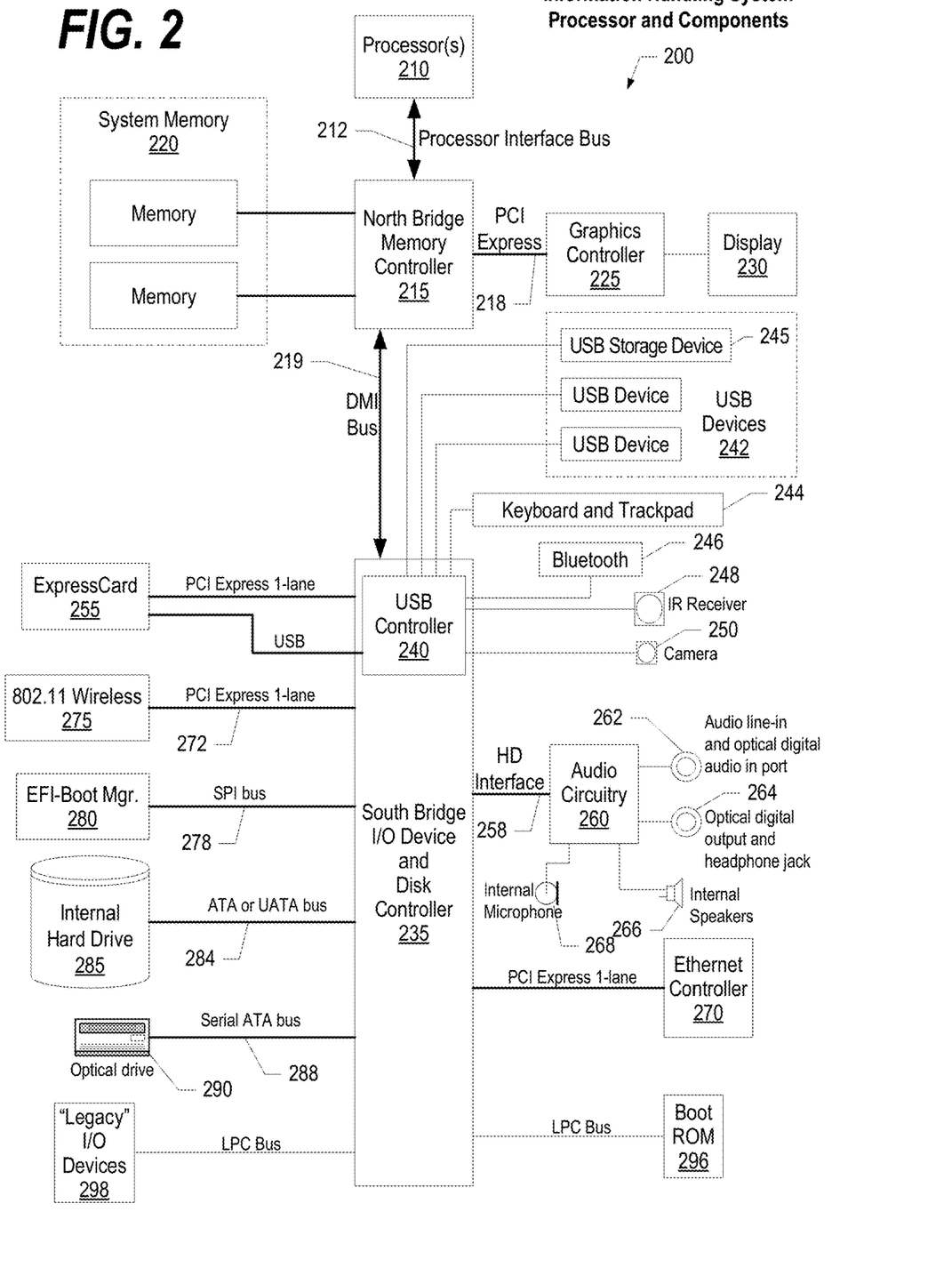
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE. 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
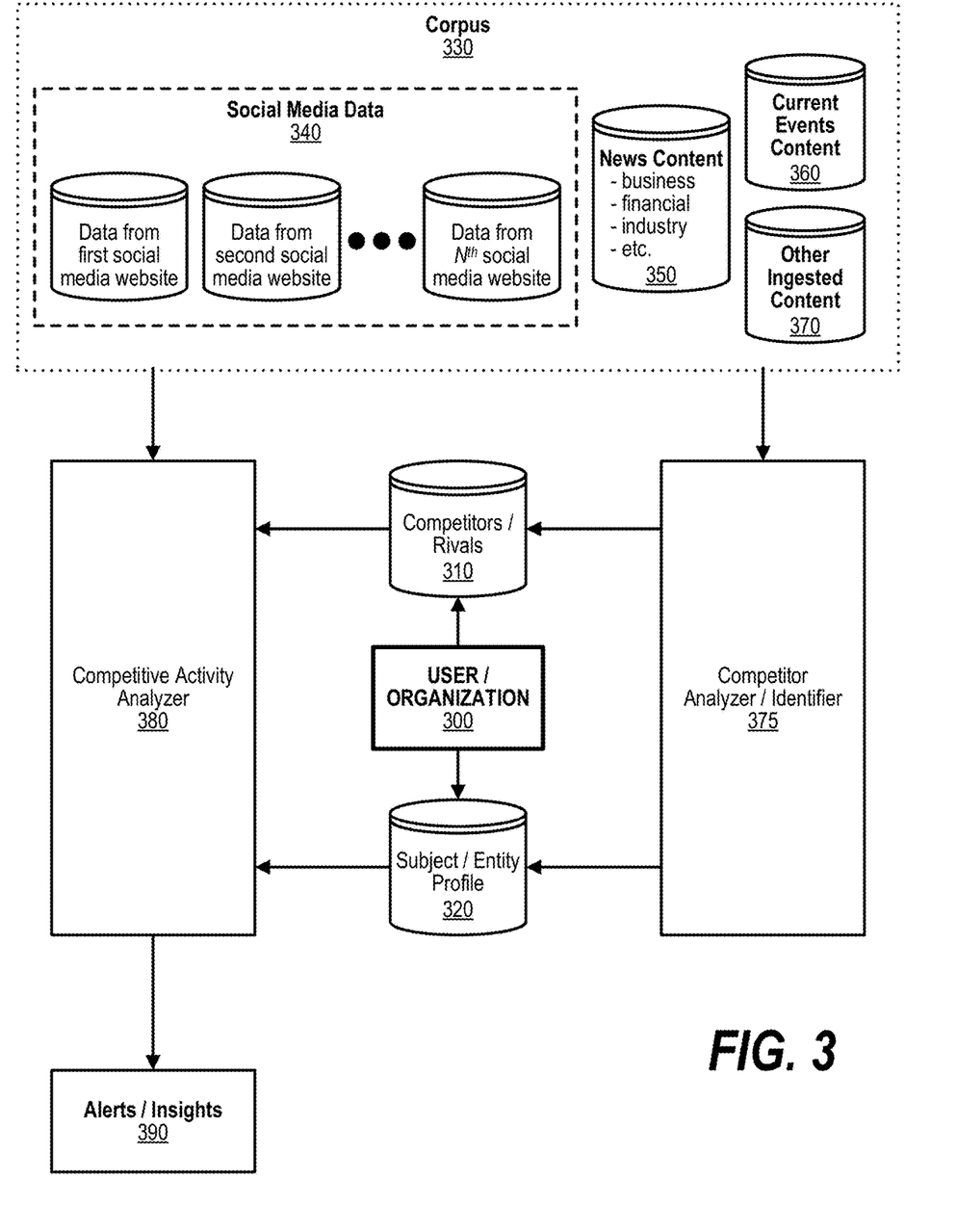
FIG. 3 is an exemplary diagram depicting the components utilized in creating a co-opetition index based on rival behavior in social networks.

FIG. 3 is an exemplary diagram depicting the components utilized in creating a co-opetition index based on rival behavior in social networks. Organization 300 has competitor/rival data store 310 generated based on the organization's profile 320. The profile pertains to the organization or entity with the organization's interests, activities, areas of interest, action plans, keywords that analysis should take into account, etc. The profile also includes next best competitive actions (NBCAs) utilized by the organization when responding to rival's actions that are relevant to the organization's business with the NCBAs including the payoff function used by a Bayesian game analysis when analyzing the next actions to take by the organization.

Corpus 330 is a body of data collected from online sources. These sources include data gathered from social media websites 340, news content websites 350, current events content 360, and other online ingested content. In one embodiment, corpus 330 is utilized by a question answering (QA) system that ingests the documents into the corpus and answers natural language questions pertaining to competitive activities found in the corpus that correspond to the organization's competitors. Competitor analyzer/identifier module 375 utilizes the data in corpus 330 to identify the organization's competitors and rivals with this data being stored in data store 310. Competitive activity analyzer module 380 analyzes the competitive activities pertaining to the organization's competitors, generates the co-petitive index, and provides alerts and insights to the user of the system at 390.

Figure 4:
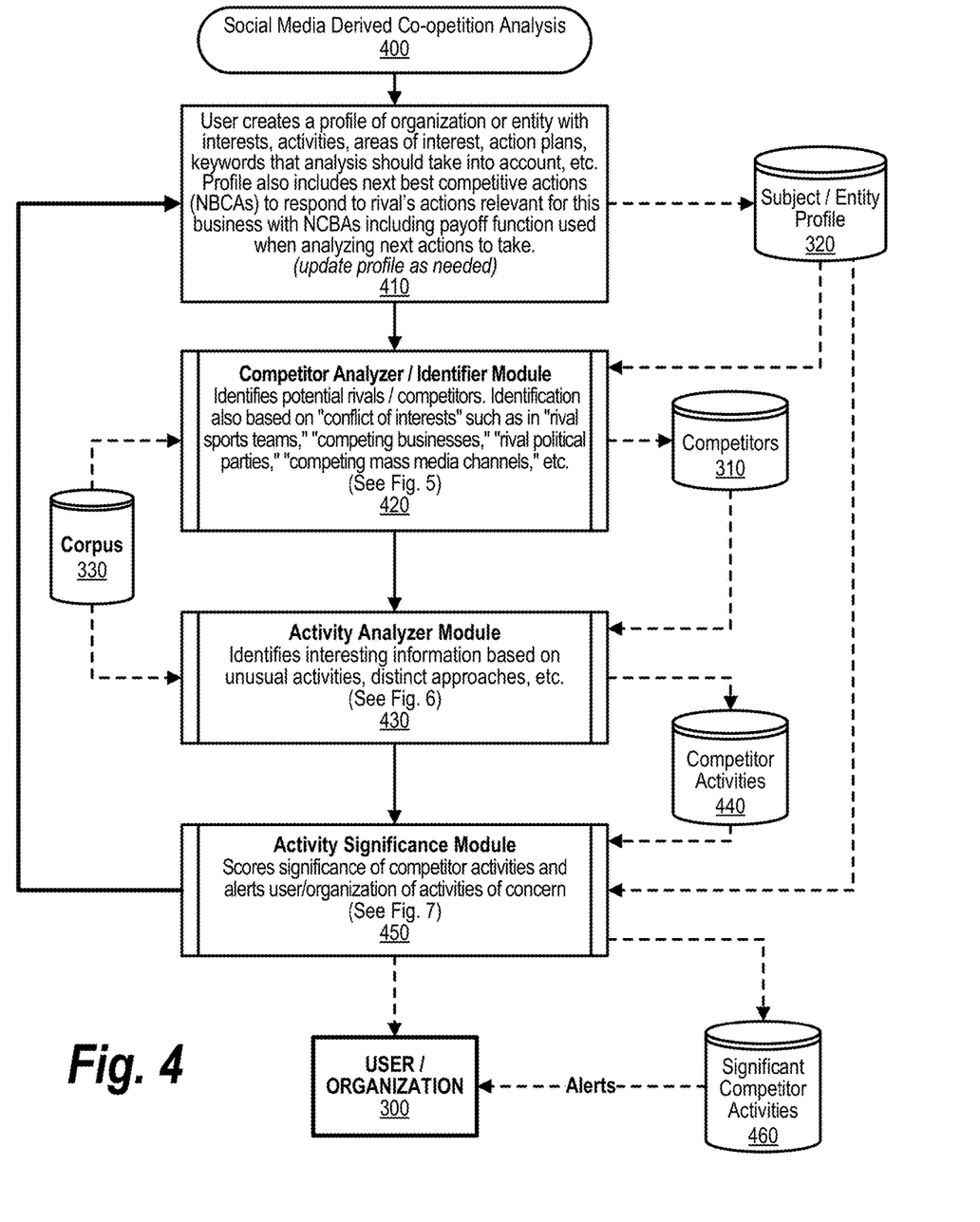
FIG. 4 is an exemplary high-level flowchart that performs steps to create a co-opetition index based on rival behavior in social networks.

FIG. 4 is an exemplary high-level flowchart that performs steps to creating a co-opetition index based on rival behavior in social networks. FIG. 4 processing commences at 400 and shows the steps taken by a process that performs a social media derived co-opetition analysis on behalf of an organization. At step 410, the user of the system creates a profile of the organization or entity that is utilizing the system. The profile includes the organization's interests, activities, areas of interest, action plans, and keywords that the analysis should take into account, etc. The profile also includes the next best competitive actions (NBCAs) that the organization can take to respond to a competitor's actions relevant for this business with the NCBAs including a payoff function that is used when analyzing the next actions to take. The profile is updated by the organization as needed and stored in data store 320.

Figure 5:
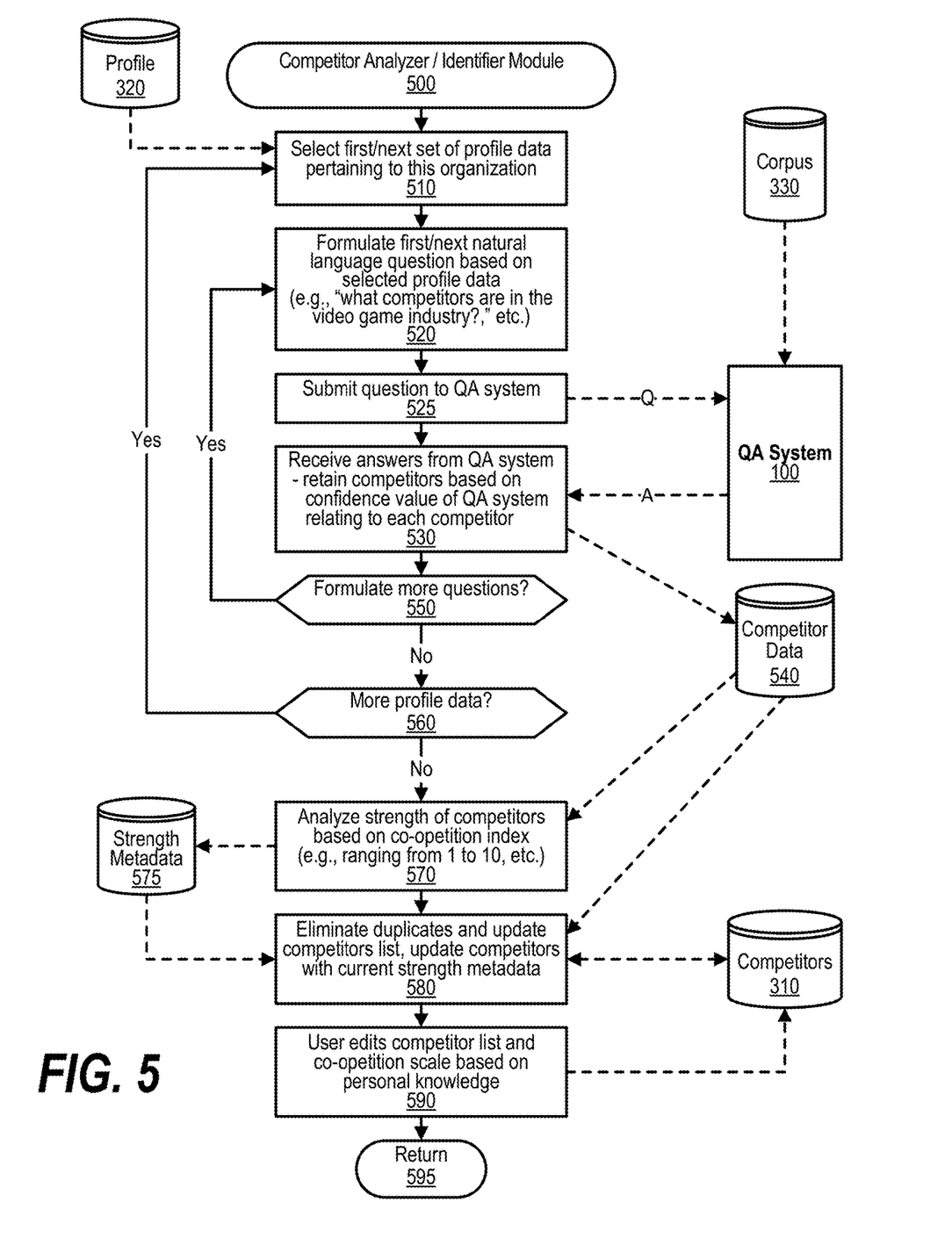
FIG. 5 is an exemplary flowchart that performs steps to perform a competitor analysis and identification module.

At predefined process 420, the process performs the Competitor Analyzer/Identifier Module (see FIG. 5 and corresponding text for processing details). This routine identifies potential rivals and competitors. Identification of rivals and competitors is also based on "conflict of interests" such as in "rival sports teams," "competing businesses," "rival political parties," "competing mass media channels," etc. Predefined process 420 utilizes corpus 330 in identifying competitors. The competitors identified as a result of predefined process 420 are stored in data store 310. At predefined process 430, the process performs the Activity Analyzer Module (see FIG. 6 and corresponding text for processing details). This routine identifies interesting information corresponding to the identified competitors. The analysis is based on unusual activities, distinct approaches, etc. found in corpus 330. The results from predefined process 430 are stored in data store 440.

Figure 7:
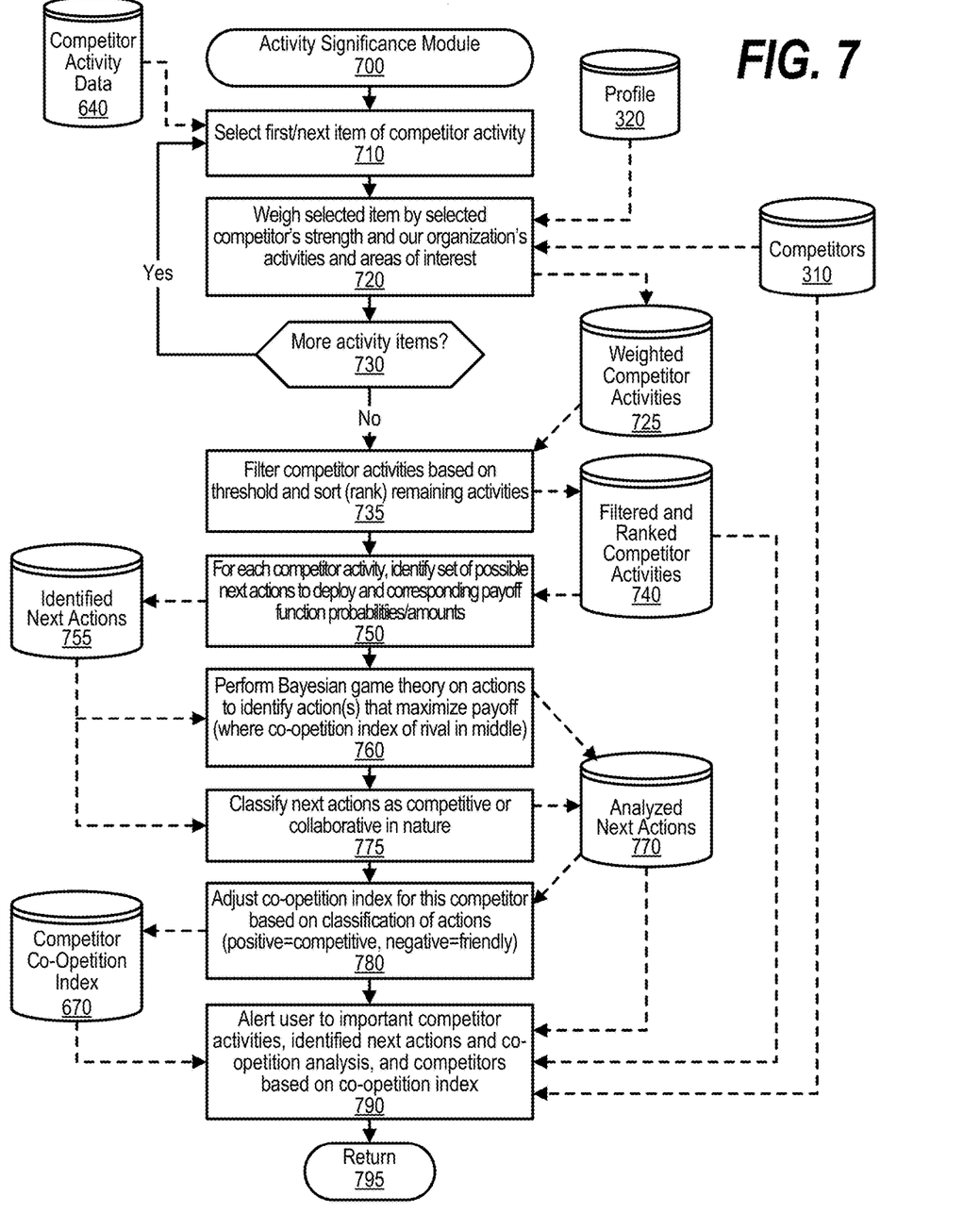
FIG. 7 is an exemplary flowchart that performs steps to perform an activity significance module based on the identified and analyzed competitor activities.

At predefined process 450, the process performs the Activity Significance Module (see FIG. 7 and corresponding text for processing details). This routine scores the significance of competitor activities found by predefined process 430 and also alerts the user or organization of activities of concern that were identified by predefined process 450. The competitor activities that are analyzed are retrieved from data store 440 and the resulting significant competitor activities are stored in data store data store 460. The user or organization retrieves significant competitor activities from data store 460 as alerts and reports. These alerts and reports help guide the organization's decision makers regarding next actions to take with regard to significant competitor activities identified by the processing shown in FIG. 4.

FIG. 5 is an exemplary flowchart that performs steps to perform a competitor analysis and identification module. FIG. 5 processing commences at 500 and shows the steps taken by a process that analyzes data to identify and commence analysis of competitors to the organization. At step 510, the process selects the first set of profile data pertaining to the organization. The profile data is retrieved from data store 320. At step 520, the process formulates the first natural language question based on the selected profile data. An example natural language question for an organization that produces video games might be, "what competitors are in the video game industry?" At step 525, the process submits the formulated question to question answering (QA) system 100. At step 530, the process receives answers from QA system. In one embodiment, QA system 100 provides confidence values corresponding to the various responses provided. In this embodiment, the process retains competitors based on the confidence value provided by the QA system relating to each competitor. The competitor data received at step 530 is stored in data store 540. The process determines as to whether more natural language questions are to be formulated to identify competitors (decision 550). If more natural language questions are to be formulated to identify competitors, then decision 550 branches to the 'yes' branch which loops back to step 520 to formulate and submit the next natural language question. This looping continues until there are more natural language questions to be formulated, at which point decision 550 branches to the 'no' branch exiting the loop. The process determines as to whether there is more profile data from data store 320 to process (decision 560). If there is more profile data to process, then decision 560 branches to the 'yes' branch which loops back to step 510 to select and process the next set of profile data from data store 320. This looping continues until there is no more profile data to process, at which point decision 560 branches to the 'no' branch exiting the loop.

At step 570, the process analyzes the strength of competitors stored in data store 540 based on the co-opetition index. In one embodiment, the co-petitive index is a scale from one to ten with one being a close business partner (friend) and ten being a strong rival (foe). The strength analysis data is stored as strength metadata in data store 575. At step 580, the process eliminates duplicate competitor entries from data store 575 and updates the list of the organization's competitors in data store 310. The update includes adding newly found competitors as well as updating competitors based on the current strength metadata stored in data store 575. At step 590, the users is allowed to edit the competitor list and the co-opetition scale data based on personal knowledge of the user, such as a decision maker of the organization. FIG. 5 processing thereafter returns to the calling routine (see FIG. 4) at 595.

Figure 6:
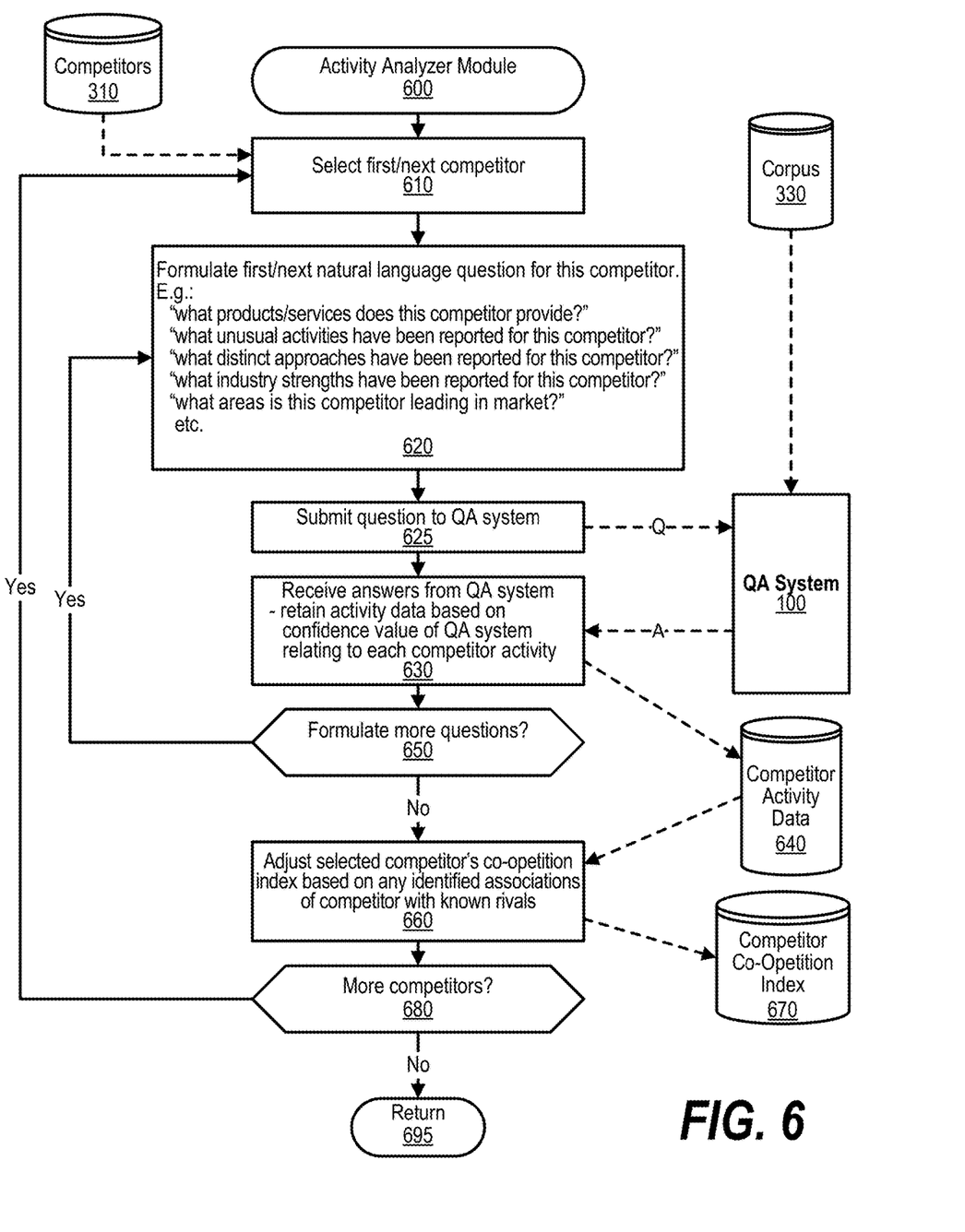
FIG. 6 is an exemplary flowchart that performs steps to perform an activity analyzer module of competitor activities.

FIG. 6 is an exemplary flowchart that performs steps to perform an activity analyzer module of competitor activities. FIG. 6 processing commences at 600 and shows the steps taken by a process that analyzes activities of competitors as gathered from online sources, such as social media sources, and stored in corpus 330. At step 610, the process selects the first competitor from data store 320. At step 620, the process formulates the first natural language question for this competitor. Example natural language questions might include "what products or services does this competitor provide?", "what unusual activities have been reported for this competitor?", "what distinct approaches have been reported for this competitor?", "what industry strengths have been reported for this competitor?", "what areas is this competitor leading in market?", and the like.

At step 625, the process submits the formulated natural language question to QA system 100. At step 630, the process receives answers from QA system. In one embodiment, QA system 100 provides a confidence value corresponding to each of the responses. In this embodiment, the process retains activity data based on the confidence value of QA system relating to each question. The retention might be based by comparing the confidence value to a threshold. The competitor activity data is stored in data store 640. The process determines as to whether more natural language questions are being formulated to analyze the selected competitor's activities (decision 650). If more natural language questions are being formulated to analyze the selected competitor's activities, then decision 650 branches to the 'yes' branch which loops back to step 610 to formulate the next question. This looping continues until no more questions are being formulated, at which point decision 650 branches to the 'no' branch exiting the loop.

At step 660, the process adjusts the selected competitor's co-opetition index based on any identified associations of competitor with known rivals. The associations are identified from the competitor's activities stored in data store 640 and the co-petitive index is stored in data store 670. The process determines as to whether there more competitors to select and process (decision 680). If there more competitors to select and process, then decision 680 branches to the 'yes' branch which loops back to step 610 to select and process the next competitor from data store 310 as described above. This looping continues until there are no more competitors to process, at which point decision 680 branches to the 'no' branch exiting the loop. FIG. 6 processing thereafter returns to the calling routine (see FIG. 4) at 695.

FIG. 7 is an exemplary flowchart that performs steps to perform an activity significance module based on the identified and analyzed competitor activities. FIG. 7 processing commences at 700 and shows the steps taken by a process that analyzes the significance of identified competitor activities. At step 710, the process selects the first item of competitor activity from data store 640. At step 720, the process weights the selected item of competitor activity by the selected competitor's strength retrieved from data store 310 as well as from the organization's activities and areas of interest retrieved from the organization's profile stored in data store 320. The weighted competitor activities are stored in data store 725. The process determines as to whether more competitor activity items to process (decision 730). If there are more competitor activity items, then decision 730 branches to the 'yes' branch which loops back to step 710 to select and process the next competitor activity from data store 640. This looping continues until there are no more competitor activities to process, at which point decision 730 branches to the 'no' branch exiting the loop.

At step 735, the process filters the weighted competitor activities based on a threshold value and sorts, or ranks, the remaining weighted competitor activities based on the weight associated with the activities. At step 750, for each competitor activity, the process identifies a set of possible next business actions to deploy and the corresponding payoff function in terms of probabilities and amounts. The identified next actions are stored in data store 755. At step 760, the process performs a Bayesian game theory on the identified next actions to identify the actions that maximize payoff. In one embodiment, the payoff is maximized when the co-opetition index of the competitor falls in the middle of the co-petitive index scale. For example, if the scale is from one to ten with one being a close business partner (friend) and ten being a strong rival (foe), then the maximum payoff would be roughly an index value of five, halfway on the scale. The analyzed next actions are stored in data store 770.

At step 775, the process classifies the identified next actions as being either competitive or collaborative in nature. The classifications are associated with the respective next actions and stored in data store 770. At step 780, the process adjusts the co-opetition index for this competitor based on the classification of analyzed next actions stored in data store 770. In one embodiment, next actions classified as competitive in nature receive positive values moving the index up the scale, while next actions classified as collaborative in nature receive negative values moving the index down the scale. The competitor's adjusted co-petitive index value is stored in data store 670. At step 790, the process alerts a user in the organization to important competitor activities, identified next actions, co-opetition analysis results, and competitors based on the co-opetition index. The competitor data is retrieved from data store 310, the competitor's co-petitive index is retrieved from data store 670, the filtered and ranked competitor activities are retrieved from data store 740, and the next actions are retrieved from data store 770. FIG. 7 processing thereafter returns to the calling routine (see FIG. 4) at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor to create a co-opetition index, the method comprising:
    ingesting data from a plurality of online sources into a question answering (QA) system corpus;
    submitting a formulated natural language competitive-oriented question to the QA system;
    receiving a plurality of responses from the QA system based on the ingested data, wherein the plurality of responses comprise a plurality of competitor activities associated with a plurality of competitors of an organization in a co-opetition environment;
    ranking the plurality of competitor activities by a strength value associated with its corresponding one of the plurality of competitors and a set of profile data associated with the organization;
    comparing the ranked plurality of competitor activities to a threshold and filtering the ranked plurality of competitor activities based on the comparison;

automatically identifying a plurality of possible next business actions to perform based on the filtered competitor activities;

analyzing the plurality of possible next business actions using a game theory analysis, wherein the analyzing results in an identification of at least one of the plurality of possible next business actions that maximize a payoff in the co-opetition environment;

adjusting a co-opetition index corresponding to a selected one of the plurality of competitors based on a classification of the identified at least one possible next business action on a competitiveness scale, wherein the classification is selected from the group consisting of a competitive classification and a collaborative classification; and alerting a user in the organization of the at least one of the possible next business action based on the adjusted co-opetition index.

2. The method of claim 1 further comprising:

creating a profile of the organization, wherein the profile includes one or more keywords and a list of business actions that include the plurality of possible next business actions; and comparing the profile to the ingested data to identify the plurality of competitors.

3. The method of claim 1 further comprising:

updating the plurality of competitors based on the plurality of competitor activities; and further adjusting the co-opetition index corresponding to the selected competitor based on identified associations of the selected competitor with one or more known rivals of the organization.

4. The method of claim 1 further comprising:

identifying a new competitor to the organization based on an analysis of the plurality of competitor activities;

adding the new competitor to the plurality of competitors of the organization; and alerting the user of the new competitor.

5. The method of claim 1 further comprising:

performing a Bayesian game theory analysis on each of the identified plurality of possible next business actions, wherein the analysis results in a payoff value associated with each of the identified plurality of possible next business actions.

6. The method of claim 1 further comprising:

selecting the at least one possible next business action based on the maximized payoff, wherein the payoff is maximized when the co-opetition index of the selected competitor is halfway between a minimum and a maximum value on the competitiveness scale.

7. An information handling system comprising:
one or more processors;
one or more data stores accessible by at least one of the processors;
a memory coupled to at least one of the processors; and
a set of computer program instructions stored in the memory and executed by at least one of the processors in order to create a co-opetition index by performing actions comprising:
  ingesting data from a plurality of online sources into a question answering (QA) system corpus;
  submitting a formulated natural language competitive-oriented question to the QA system;
  receiving a plurality of responses from the QA system based on the ingested data, wherein the plurality of responses comprise a plurality of competitor activities associated with a plurality of competitors of an organization in a co-opetition environment;
  ranking the plurality of competitor activities by a strength value associated with its corresponding one of the plurality of competitors and a set of profile data associated with the organization;
  comparing the ranked plurality of competitor activities to a threshold and filtering the ranked plurality of competitor activities based on the comparison;
  automatically identifying a plurality of possible next business actions to perform based on the filtered competitor activities;
  analyzing the plurality of possible next business actions using a game theory analysis, wherein the analyzing results in an identification of at least one of the plurality of possible next business actions that maximize a payoff in the co-opetition environment;
  adjusting a co-opetition index corresponding to a selected one of the plurality of competitors based on a classification of the identified at least one possible next business action on a competitiveness scale, wherein the classification is selected from the group consisting of a competitive classification and a collaborative classification; and
  alerting a user in the organization of the at least one of the possible next business action based on the adjusted co-opetition index.

8. The information handling system of claim 7 wherein the actions further comprise:

creating a profile of the organization, wherein the profile includes one or more keywords and a list of business actions that include the plurality of possible next business actions; and comparing the profile to the ingested data to identify the plurality of competitors.

9. The information handling system of claim 7 wherein the actions further comprise:

updating the plurality of competitors based on the plurality of competitor activities; and further adjusting the co-opetition index corresponding to the selected competitor based on identified associations of the selected competitor with one or more known rivals of the organization.

10. The information handling system of claim 7 wherein the actions further comprise:

identifying a new competitor to the organization based on an analysis of the plurality of competitor activities adding the new competitor to the plurality of competitors of the organization; and alerting the user of the new competitor.

11. The information handling system of claim 7 wherein the actions further comprise:

performing a Bayesian game theory analysis on each of the identified plurality of possible next business actions, wherein the analysis results in a payoff value associated with each of the identified plurality of possible next business actions.

12. The information handling system of claim 7 wherein the actions further comprise:

selecting the at least one possible next business action based on the maximized payoff, wherein the payoff is maximized when the co-opetition index of the selected competitor is halfway between a minimum and a maximum value on the competitiveness scale.

13. A computer program product stored in a computer readable storage medium, comprising computer program code that, when executed by an information handling system, causes the information handling system to create a co-opetition index by performing actions comprising:

ingesting data from a plurality of online sources into a question answering (QA) system corpus;

submitting a formulated natural language competitive-oriented question to the QA system;

receiving a plurality of responses from the QA system based on the ingested data, wherein the plurality of responses comprise a plurality of competitor activities associated with a plurality of competitors of an organization in a co-opetition environment;

ranking the plurality of competitor activities by a strength value associated with its corresponding one of the plurality of competitors and a set of profile data associated with the organization;

comparing the ranked plurality of competitor activities to a threshold and filtering the ranked plurality of competitor activities based on the comparison;

automatically identifying a plurality of possible next business actions to perform based on the filtered competitor activities;

analyzing the plurality of possible next business actions using a game theory analysis, wherein the analyzing results in an identification of at least one of the plurality of possible next business actions that maximize a payoff in the co-opetition environment;

adjusting a co-opetition index corresponding to a selected one of the plurality of competitors based on a classification of the identified at least one possible next business action on a competitiveness scale, wherein the classification is selected from the group consisting of a competitive classification and a collaborative classification; and alerting a user in the organization of the at least one of the possible next business action based on the adjusted co-opetition index.

14. The computer program product of claim 13 wherein the actions further comprise:

creating a profile of the organization, wherein the profile includes one or more keywords and a list of business actions that include the plurality of possible next business actions; and comparing the profile to the ingested data to identify the plurality of competitors.

15. The computer program product of claim 13 wherein the actions further comprise:

updating the plurality of competitors based on the plurality of competitor activities; and further adjusting the co-opetition index corresponding to the selected competitor based on identified associations of the selected competitor with one or more known rivals of the organization.

16. The computer program product of claim 13 wherein the actions further comprise:

identifying a new competitor to the organization based on an analysis of the plurality of competitor activities adding the new competitor to the plurality of competitors of the organization; and alerting the user of the new competitor.

17. The computer program product of claim 13 wherein the actions further comprise:

performing a Bayesian game theory analysis on each of the identified plurality of possible next business actions, wherein the analysis results in a payoff value associated with each of the identified plurality of possible next business actions.

* * * * *